US008499499B2

(12) United States Patent
Cotnoir

(10) Patent No.: US 8,499,499 B2
(45) Date of Patent: Aug. 6, 2013

(54) WEATHER STRIP FOR MOTOR VEHICLE

(75) Inventor: Doumik Cotnoir, Quebec (CA)

(73) Assignee: Toyoda Gosei Co., Ltd., Kiyosu-shi, Aichi-ken (JP)

( * ) Notice: Subject to any disclaimer, the term of this patent is extended or adjusted under 35 U.S.C. 154(b) by 15 days.

(21) Appl. No.: 13/246,601

(22) Filed: Sep. 27, 2011

(65) Prior Publication Data
US 2013/0074416 A1    Mar. 28, 2013

(51) Int. Cl.
E06B 7/16    (2006.01)

(52) U.S. Cl.
USPC .......................................... 49/490.1; 49/498.1

(58) Field of Classification Search
USPC ..................... 49/475.1, 490.1, 498.1, 495.1
See application file for complete search history.

(56) References Cited

U.S. PATENT DOCUMENTS

| 4,030,245 | A | * | 6/1977 | Yeomans | 49/490.1 |
| 4,105,814 | A | * | 8/1978 | Eggert | 428/122 |
| 4,744,570 | A | * | 5/1988 | Kranz | 277/647 |
| 4,848,035 | A | * | 7/1989 | Sakuma et al. | 49/490.1 |
| 4,869,945 | A | * | 9/1989 | Harney | 428/122 |
| 4,952,442 | A | * | 8/1990 | Warner | 428/83 |
| 4,959,081 | A | * | 9/1990 | Mathellier | 49/490.1 |
| 5,305,553 | A |   | 4/1994 | Shimizu et al. | |
| 5,755,071 | A |   | 5/1998 | Drozd | |
| 6,143,397 | A |   | 11/2000 | Kanehara | |
| 6,623,014 | B1 | * | 9/2003 | Martin | 277/630 |
| 6,972,140 | B2 | * | 12/2005 | Watanabe | 428/36.9 |
| 2001/0027622 | A1 | * | 10/2001 | Mine et al. | 49/490.1 |
| 2004/0040215 | A1 | * | 3/2004 | Fujita et al. | 49/490.1 |
| 2006/0112645 | A1 | * | 6/2006 | Dron | 49/498.1 |
| 2008/0295414 | A1 | * | 12/2008 | Miyakawa et al. | 49/490.1 |
| 2010/0212230 | A1 | * | 8/2010 | Ogilvie | 49/490.1 |
| 2011/0162285 | A1 | * | 7/2011 | Lichtner et al. | 49/490.1 |

FOREIGN PATENT DOCUMENTS

| EP | 1 535 784 A1 | | 6/2005 |
| GB | 2006309 A | * | 5/1979 |
| GB | 2209788 A | * | 5/1989 |
| JP | 58-150547 U | | 10/1983 |
| JP | 58-168946 U | | 11/1983 |
| JP | 59-58621 U | | 4/1984 |
| JP | 60-3143 U | | 1/1985 |
| JP | 1-81148 U | | 5/1989 |
| JP | 5-40052 U | | 5/1993 |
| JP | 5-62313 U | | 8/1993 |
| JP | 7-277097 A | | 10/1995 |
| JP | 10-44885 A | | 2/1998 |

(Continued)

Primary Examiner — Jerry Redman
(74) Attorney, Agent, or Firm — McGinn IP Law Group, PLLC

(57) ABSTRACT

A weather strip having a trim portion capable of decreasing an insertion load of a flange and increasing a removal load thereof where the thickness of the flange varies, thereby preventing its turn against a flange. The weather strip has a trim portion and a seal portion. The trim portion has a generally U-shaped cross-section. An inner holding lip includes a base part, a main lip formed along an end of the base part, and a sub-lip formed from a side surface of the end of the base part so as to project obliquely with respect to the main lip in a direction of the opening of the trim portion. The sub-lip is made shorter than the main lip, and an end of the sub-lip is located on the opening side of an interior surface of a joint between the base part and the inner side wall.

17 Claims, 10 Drawing Sheets

FOREIGN PATENT DOCUMENTS

| | | |
|---|---|---|
| JP | 11-78723 A | 3/1999 |
| JP | 11-151992 A | 6/1999 |
| JP | 2006-143097 A | 6/2006 |
| JP | 2007-30553 A | 2/2007 |
| JP | 2007-55576 A | 3/2007 |
| JP | 2007-261567 A | 10/2007 |
| JP | 2008-207532 A | 9/2008 |
| JP | 2011-20649 A | 2/2011 |

* cited by examiner

WEATHER STRIP FOR MOTOR VEHICLE

BACKGROUND OF THE INVENTION

1. Field of the Invention

The present invention relates to a weather strip for providing a seal between an opening and closing member for opening and closing an opening formed in a vehicle body, such as a vehicle door, a trunk lid, sliding roof, etc., and an opening portion of the vehicle body.

2. Description of Related Art

Hereinafter, the present invention will be explained based on an opening trim weather strip adapted to provide a seal between a door as the opening and closing member of the vehicle body, and a door opening portion thereof, for example.

Conventionally, a door weather strip provided along an outer periphery of a door frame of a door of a motor vehicle, a glass run attached to a channel along an inner periphery of the door frame, etc., and an opening trim weather strip attached to a flange along the door opening portion of the vehicle body provide a seal between the door of the motor vehicle and the door opening portion.

As shown in FIG. 1, an opening trim weather strip 10 is attached to a door opening portion 12 over an entire length thereof, and when a door is closed, the opening trim weather strip 10 contacts a door frame 14 or an outer periphery of a door panel to seal between the door opening portion 12 and the vehicle door. As shown in FIG. 2, a flange 16 is provided in the door opening portion 12 by bonding edges of an inner panel 18 and an outer panel 20 to each other through welding.

The opening trim weather strip 10 is attached to the flange 16 in a trim portion 22 with a generally U-shaped cross-section. A tubular seal portion 24 contacts a protruding part of the door frame 14, thereby sealing the same. An insert member 26 such as a metal insert, etc. is embedded in the trim portion 22 for increasing its holding force against the flange 16, and an outer side wall 28, an inner side wall 30 and a bottom wall 32 define a generally U-shaped cross-section.

As shown in FIG. 2, outer holding lips 32 and 34 and inner holding lips 36 and 38 are formed in an interior surface of the outer side wall 28 and an interior surface of the inner side wall 30 defining a generally U-shaped cross section for holding the flange 16. When the flange 16 is inserted into the trim portion 22, tip ends of the outer holding lips 32 and 34 and the inner holding lip 36 and 38 bend to contact side faces of the flange 16 closely, thereby holding the flange 16. As a result, the opening trim weather strip can be attached to the flange 16.

As described above, the flange 16 provided in the door opening portion 12 is formed by bonding edges of the inner panel 18 and the outer panel 20 to each other through welding, but the number of panels to be bonded depends on the position in the door opening portion 12, and varies from about one to eight. Therefore, the entire thickness of the flange 16 varies from about 0.5 mm to 7.0 mm in accordance with the position in the door opening portion 12.

As shown in FIG. 3, the opening trim weather strip 10 is formed by extrusion into a single body, and is connected via a joint 4 into a loop-like configuration.

As shown in FIG. 4, in another conventional opening trim weather strip 42 having a trim portion 44 and a tubular seal portion 46, a plurality of short outer holding lips 48, 50 and 52 are provided in an interior surface of an outer side wall 54 of the trim portion 44, whereas one long inner holding lip 56 is provided in an interior surface of an inner side wall 58. (see Publication of unexamined JP patent application No. 2007-30553, for example.).

In this case, the inner holding lip 56 flexes towards an interior of the trim portion 44, namely in the direction of a bottom wall 60 in accordance with the thickness of the flange 16, thereby holding the flange 16. However, the inner holding lip 56 contacts the flange 16 at only one point so that when the tubular seal portion 46 contacts a vehicle door, etc., and particularly the thickness of the flange 16 is as thin as 0.5~1.5 mm, it is difficult to stop the turn of the trim portion 44 against the flange 16 clockwise or counterclockwise in FIG. 4.

Therefore, as shown in FIG. 5, in still another conventional opening trim weather strip 62 having a trim portion 64 and a tubular seal portion 66, a plurality of short outer holding lips 68, 70 and 72 are provided in an interior surface of an outer side wall 74 of the trim portion 64, whereas one long inner holding lip 76 is provided in an interior surface of an inner side wall 78. And a projection 80 is provided at an end of the inner holding lip 76, which faces an opening of the trim portion 64, for contacting the flange 16 (see Publication of JP utility model application No. Hei5-62313, for example).

In this case, however, the distance between projection 80 and the end of the inner holding lip 56 is small so that when they contact the flange 16, the width for holding the flange 16 is small, and the projection 80 is located on the side of an interior of the trim portion 64, namely on the side of a bottom wall 82, as compared with a joint between the inner holding lip 76 and the inner side wall 78, whereby such a force as to stop the turn of the trim portion 82 against the flange 16 is small.

In addition, a projection 84 is provided along an end of the inner side wall 78 for preventing the inner holding lip 76 from flexing backwardly, but since the projection 84 is located away from a root of the inner holding lip 76, the projection 84 cannot operate except when the inner holding lip 76 greatly flexes backwardly, and consequently, the flange 16 cannot be sufficiently prevented from coming off the opening trim weather strip 62.

As shown in FIG. 6, in a further conventional opening trim weather strip 86, two outer holding lips 88 and 90 are provided in an interior surface of an outer side wall 92 of a trim portion 94, and two inner holding lips 96 and 98 are similarly provided in an interior surface of an inner side wall 100, and an end of each of the outer holding lips 88 and 90 and the inner holding lips 96 and 98 diverges to contact the flange 16 (see Publication of JP utility model application No. Sho58-168946, for example.).

In this case, the turn of the trim portion 94 against the flange 16 can be prevented to securely hold the opening trim weather strip 86 against the flange 16, but where the thickness of the flange 16 varies, the outer holding lips 88 and 90 and the inner holding lips 96 and 98 cannot sufficiently flex, and the contact area of an end of each of the outer holding lips 88 and 90 and the inner holding lips 96 and 98 against the flange 16 is great, thereby making the insertion of the flange 16 difficult.

As shown in FIG. 7, in still further conventional opening trim weather strip 102 having a trim portion 104 and a tubular seal portion 106, two outer holding lips 108 and 110 are provided in an interior surface of an outer side wall 112 of the trim portion 104, and two inner holding lips 114 and 116 are provided in an interior surface of an inner side wall 118. And a projection 120 made of a sponge rubber is provided at an end of the inner holding 114, which faces an opening of the trim portion 104, for contacting the flange 16 (see Publication of unexamined JP patent application No. Hei3-204358, for example.).

Since the flange 16 is held with the outer holding lips 108 and 110 and the inner holding lips 114 and 116, the turn of the trim portion 104 against the flange 16 can be prevented, but where the thickness of the flange 16 varies, the outer holding lips 108 and 110 and the inner holding lips 114 and 116 cannot sufficiently flex, similarly to the case shown in FIG. 6, thereby making the insertion of the flange 16 difficult. In addition, the projection 120 made of a sponge rubber closely contacts the flange 16 to seal the same, but does not exhibit a great holding force against the flange 16.

SUMMARY OF THE INVENTION

Accordingly, it is an object of the present invention to provide a weather strip having a trim portion capable of decreasing an insertion load of a flange and increasing a removal load thereof even where the thickness of the flange varies, thereby preventing its turn against the flange.

In order to achieve the above-described object, according to a first aspect of the present invention, a weather strip adapted to provide a seal between a closing member for closing an opening in a body of a motor vehicle and an opening portion of the body of the motor vehicle, includes a trim portion for attachment to a flange provided in the closing member or the opening portion; and a seal portion integrally formed with the trim portion for contacting the opening portion or the closing member to provide a seal between the closing member and the opening portion. The trim portion has an outer side wall, an inner side wall and a bottom wall, and has a generally U-shaped cross-section. A plurality of outer holding lips are provided in an interior surface of the outer side wall, and an inner holding lip is provided in an interior surface of the inner side wall so as to project into an interior of said trim portion obliquely. The inner holding lip includes a base part extending from the interior surface of the inner side wall, a main lip formed continuously with an end of the base part so as to project in an extending direction of the base part, and a sub-lip formed from a side surface of the end of the base part, which faces an opening of the trim portion, so as to project obliquely with respect to the main lip in an direction of the opening of the trim portion. The sub-lip is made shorter than the main lip, and an end of the sub-lip is formed so as to be located on an opening side of an interior surface of a joint between the base part and the inner side wall.

In the first aspect of the present invention, the weather strip has a trim portion with a generally U-shaped cross-section, which is adapted to be attached to a flange provided in the closing member or the opening portion, and a seal portion integrally formed with the trim portion for contacting the opening portion or the closing member to provide a seal between the closing member and the opening portion. Therefore, when the trim portion is attached to the flange, the seal portion securely contacts the opening portion or the closing member, thereby providing a seal therebetween.

Since the trim portion has an outer side wall, an inner side wall and a bottom wall, and has a generally U-shaped cross-section, flange holding lips can be provided in interior surfaces of the outer side wall and the inner side wall for holding the flange, whereby the trim portion is stably attached to the flange, and consequently, the position of the seal portion becomes stable, and a seal between the closing member and the opening portion can be securely provided.

One inner holding lip is provided in an interior surface of the inner side wall in a longitudinal direction thereof for holding the flange. Therefore, the flange can be held with the inner holding lip and the outer holding lip securely.

Since a plurality of outer holding lips are provided in an interior surface of the outer side wall, a plurality of outer holding lips can be made to contact an outer side surface of the flange, whereby the outer side surface of the flange can be held stably.

Since the inner holding lip is provided in the interior surface of the inner side wall so as to obliquely project into an interior of said trim portion, the inner holding lip can flex according to the variations in thickness of the flange, thereby pressing the flange against a plurality of outer holding lips constantly, and consequently holding the flange stably.

The inner holding lip includes a base part extending from the interior surface of the inner side wall, a main lip formed continuously with an end of the base part so as to project in an extending direction of the base part, and a sub-lip formed from a side surface of the end of the base part, which faces an opening of the trim portion, so as to project obliquely with respect to the main lip in an direction of the opening of the trim portion. Therefore, the base part stably holds the main lip and the sub-lip, whereby the main lip and the sub-lip can hold the inner side surface of the flange at two points over a great width so that when the trim portion rocks clockwise or counterclockwise with respect to the flange, it can hold the flange stably.

Since the sub-lip is made shorter than the main lip, the sub-lip is prevented from increasing the insertion load when a thin flange is inserted.

Since an end of the sub-lip is formed so as to be located on the opening side of an interior surface of a joint between the base part and the inner side wall, the end of the sub-lip can be located on the opening side of the interior surface of the joint between the base part and the inner side wall with respect to a plane perpendicular to the interior surface of the inner side wall, whereby the inner holding lip can stably hold the inner side surface of the flange.

According to a second aspect of the present invention, the end of the sub-lip is located between the interior surface of the joint between the base part and the inner side wall, and an exterior surface of the joint between the base part and the inner side wall.

In the second aspect of the present invention, the end of the sub-lip is located between the interior surface of the joint between the base part and the inner side wall, and an exterior surface of the joint between the base part and the inner side wall. Therefore, when a force is applied from the flange to the end of the sub-lip, the base part of the inner holding lip can receive a resulting load to prevent the turn of the flange, thereby stably holding the inner side surface of the flange.

According to a third aspect of the present invention, the sub-lip has a surface on the side of an opening of the trim portion, which curves so as to concave in a direction of the bottom wall.

In the third aspect of the present invention, since the sub-lip has a surface on the side of an opening of the trim portion, which curves so as to concave in a direction of the bottom wall, the sub-lip can face the opening of the trim portion when the end of the sub-lip contacts the flange, whereby the sub-lip can apply a force to the flange clockwise, and the distance between the end of the sub-lip and the end of the main lip increases so that even when the trim portion turns, it can stably hold the flange.

According to a fourth aspect of the present invention, the sub-lip is formed to have a thickness gradually decreasing towards an end thereof, and a length greater than the thickness of a root thereof, which is continuous with the base part.

In the fourth aspect of the present invention, the sub-lip is formed to have a thickness gradually decreasing towards an end thereof, and a length greater than the thickness of a root thereof, which is continuous with the base part. Therefore, the flexibility of the sub-lip increases to decrease the insertion load of the flange, and when the thickness of the flange varies, the sub-lip can contact the same securely.

According to a fifth aspect of the present invention, one of the outer holding lips is located between the end of the main lip and the end of the sub-lip.

In the fifth aspect of the present invention, one of the outer holding lips is located between the end of the main lip and the end of the sub-lip. Therefore, when the end of the main lip and the end of the sub-lip apply forces to the flange, an end of one outer holding lip receives such forces, thereby holding the flange stably.

According to a sixth aspect of the present invention, the main lip has a bending part at the end thereof, which obliquely bends in a direction of an interior of the trim portion.

In the sixth aspect of the present invention, the main lip has a bending part at the end thereof, which obliquely bends in a direction of an interior of the trim portion. Therefore, when the flange is inserted in the interior of the trim portion, the bending part at the end of the main lip flexes to decrease the insertion load of the flange, and after the flange is inserted therein, the contact area of the bending part against the inner side surface of the flange increases, thereby holding the flange stably, and the removal load of the flange increases, thereby increasing the holding force against the flange.

According to a seventh aspect of the present invention, the inner holding lip is one.

In the seventh aspect of the present invention, since the inner holding lip is one, one inner holding lip can readily flex in a direction of the interior of the trim portion according to the variations in thickness of the flange, without being obstructed by another inner holding lip, whereby the flange can be readily inserted, while maintaining the flange holding force.

According to an eighth aspect of the present invention, the inner holding lip has a slit that extends from an exterior surface of the joint between the base part and the inner side wall inwardly of the joint.

In the eighth aspect of the present invention, the inner holding lip has a slit that extends from an exterior surface of the joint between the base part and the inner side wall inwardly of the joint. Therefore, the thickness of the joint decreases so that the inner holding lip readily flexes in the direction of the interior of the trim portion when the flange is inserted in the trim portion, whereby the insertion load can be reduced. When the flange is pulled in a direction in which the flange is removed, the slit is closed and the inner holding lip contacts the flange so that the removal load of the flange can be increased.

According to a ninth aspect of the present invention, a projection is provided in a surface of the inner side wall or a surface of the base part, which faces the inner side wall in the vicinity of an entrance of the slit.

In the ninth aspect of the present invention, a projection is provided in a surface of the inner side wall or a surface of the base part, which faces the inner side wall, in the vicinity of the entrance of the slit. Therefore, when the flange is pulled in a direction in which the flange is removed, the slit is closed, and consequently, the base part or the inner side wall contacts the projection to prevent the inner holding lip from greatly flexing towards the opening of the trim portion, whereby the removal load of the flange does not decrease.

According to a tenth aspect of the present invention, the weather strip is arranged such that the end of the outer holding lip and the end of the inner holding lip respectively contact side surfaces of the flange when the trim portion is attached to the flange.

In the tenth aspect of the present invention, when the trim portion is attached to the flange, the end of the outer holding lip and the end of the inner holding lip respectively contact side surfaces of the flange even when the thickness of the flange is the smallest, whereby they can securely hold the flange from both side surfaces thereof.

According to an eleventh aspect of the present invention, the trim portion further includes an insert that is embedded in the outer side wall, the inner side wall and the bottom wall.

In the eleventh aspect of the present invention, since the insert is embedded in the outer side wall, the inner side wall and the bottom wall, the trim portion exhibits such a rigidity as to prevent the inner side wall and the outer side wall from spreading apart on the side of the opening of the trim portion. Therefore, the inner holding lip and the outer holding lips can strongly hold the flange.

According to a twelfth aspect of the present invention, the trim portion further includes an outer protrusion that protrudes from the vicinity of a joint between an interior surface of the outer side wall and the bottom wall.

In the twelfth aspect of the present invention, since the outer protrusion is formed in the vicinity of the joint between the interior surface of the outer side wall and the bottom wall, when the flange is inserted in the interior of the trim portion to its bottom, the outer protrusion can contact the end of the flange, whereby the position of the end of the flange becomes stable, and the flange can be securely held.

According to a thirteenth aspect of the present invention, the distance (A) between the end 162 of the main lip 154 and the end 164 of the sub-lip 156 so as to satisfy the formula (1). In this case, $$2.5 \leq A \leq (L \cdot \cos \theta) + W' \quad (1)$$

L is the entire length (L) of the inner holding lip (inclusive of the bending part of the main lip). The angle θ is an angle between the inner side wall and the main lip.

W is the distance between the end of the main lip and the line AA. W' is the distance between the line AA and the end of the sub-lip. The line AA extend from the end of the sub-lip to the inside wall at right angle.

Therefore, the distance between the end of the main lip and the end of the sub-lip is sufficiently long so that they can hold the flange more stably.

According to a fourteenth aspect of the present invention, the entire length (D) of the base part of the inner holding lip and the length (L) of the inner holding lip have a relation expressed by the following inequality (2):

$$\tfrac{1}{4}L \leq D \leq \tfrac{3}{4}L \quad (2)$$

In the fourteenth aspect of the present invention, the relation between the length (D) of the base part of the inner holding lip and the entire length (L) of the inner holding lip is expressed by the inequality (2). Therefore, the base part of the inner holding lip has a sufficient length to stably support the main lip and the sub-lip, and maintain the rigidity of the inner holding lip, whereby the flange can be held more stably.

According to a fifteenth aspect of the present invention, the closing member is a door, and the weather strip is an opening trim weather strip.

In the fifteenth aspect of the present invention, the closing member is a door, and the weather strip is an opening trim weather strip so that the opening trim weather strip can be attached to an entire circumference of a door opening portion of a vehicle body, thereby providing a secure seal between the door opening portion and the door thereof along with a door weather strip.

In accordance with the present invention, the inner holding lip includes a base part, a main lip and a sub-lip so that when the flange is thin, the main lip and the sub-lip can hold the inner side surface of the flange at two points over a great width, whereby even when the trim portion swings in a rotating direction with respect to the flange, it can hold the flange stably.

Since the sub-lip is made shorter than the main lip, the sub-lip is prevented from increasing the insertion load in the case where the flange is thick.

Since the end of the sub-lip is formed to be located on the opening side of the interior surface of the joint between the base part and the inner side wall, the end of the sub-lip can be located on the opening side of the interior surface of the joint between the base part and the inner side wall, whereby when the sub-lip contacts the flange, a resulting force can be received with the joint.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

The present invention will be explained based on a door as a closing member of an opening in a vehicle body, and an opening trim weather strip 122 as a weather strip.

The present invention can be also applied to a weather strip for use in an opening of a body of a motor vehicle, and a closing member for closing the opening such as a sliding roof weather strip, luggage weather strip, etc. in addition to the opening trim weather strip 122.

The present invention will be explained with reference to FIGS. 1, 3 and 8 through 19.

Figure 1:
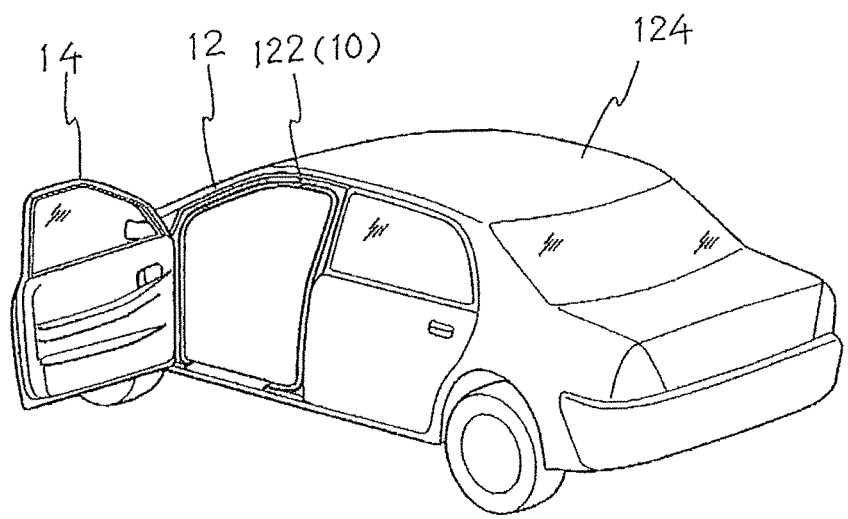
FIG. 1 is a perspective view of a motor vehicle in a state where a door is opened, which is seen from a rear side thereof.
Figure 2:
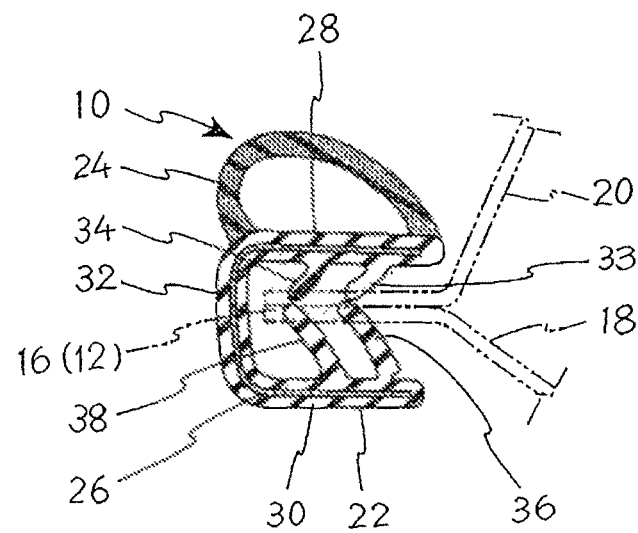
FIG. 2 is a sectional view of a conventional opening trim weather strip in an attached state to a door opening portion of a motor vehicle.
Figure 3:
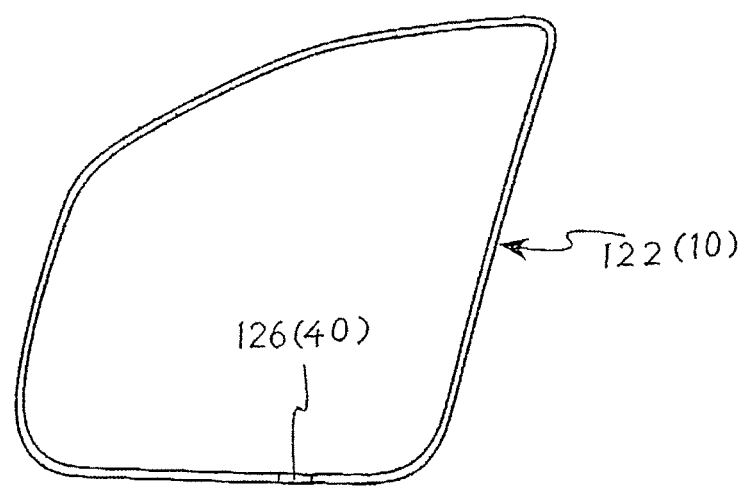
FIG. 3 is a front view of an opening trim weather strip.
Figure 4:
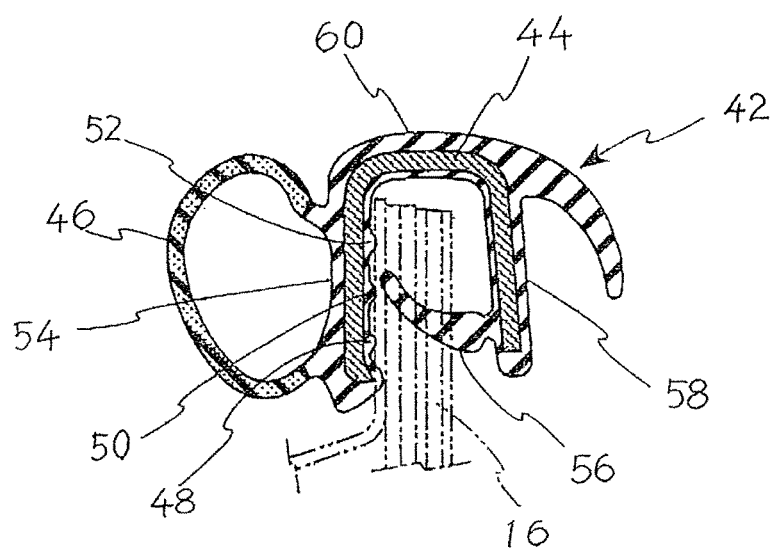
FIG. 4 is a sectional view of another conventional opening trim weather strip in an attached state to a flange.
Figure 5:
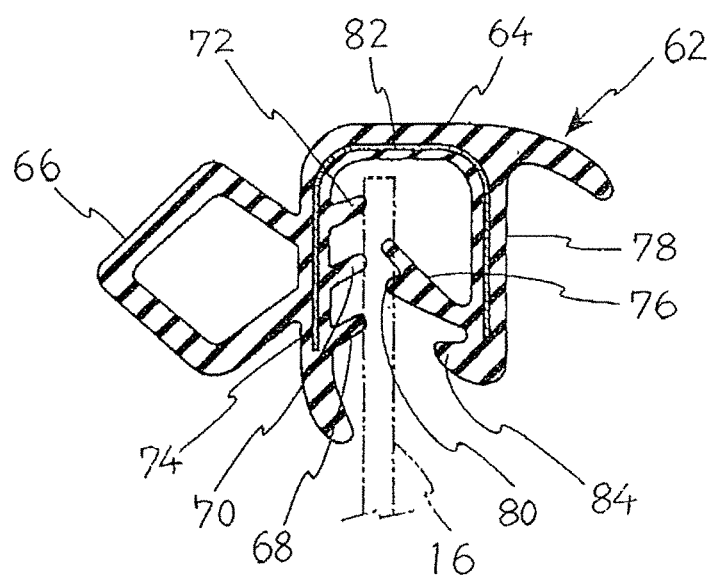
FIG. 5 is a sectional view of still another conventional opening trim weather strip in an attached state to a flange.
Figure 6:
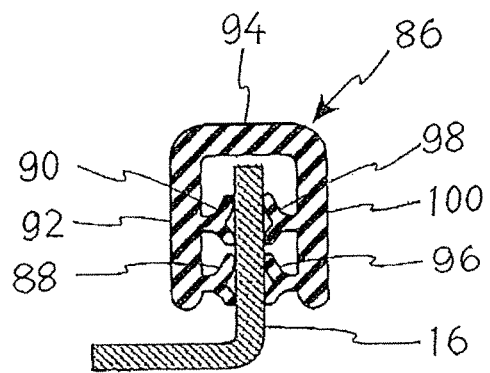
FIG. 6 is a sectional view of a further conventional opening trim weather strip of which a trim portion is in an attached state to a flange.
Figure 7:
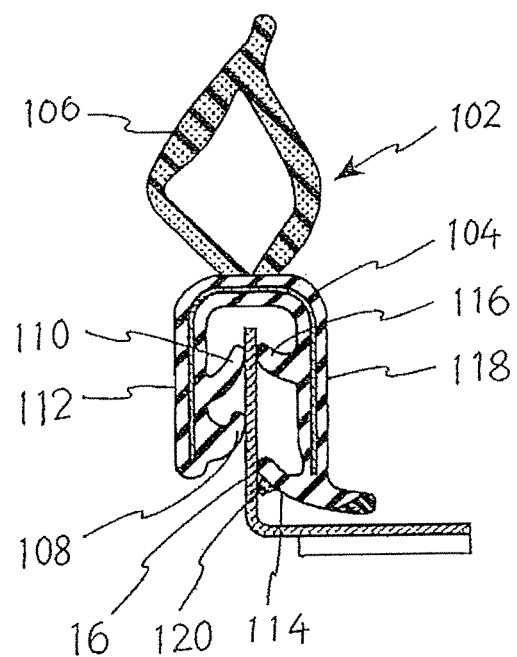
FIG. 7 is a sectional view of a still further conventional opening trim weather strip in an attached state to a flange.

FIG. 1 is a perspective view showing a door opening portion 12 in a state where a door is opened. FIG. 3 is a front view of an entire body of an opening trim weather strip 122 for attachment to the door opening portion 12.

As shown in FIG. 1, a body 124 of a motor vehicle has a door opening, and the door opening is closed and opened with a vehicle door. The door opening is defined with a door opening portion 12, and a flange 16 is provided along the door opening portion 12 by welding ends of an inner panel, an outer panel, a reinforcing panel, etc. together (see FIG. 16). The opening trim weather strip 122 is mounted on the flange 16 to provide a seal between the door opening portion 12 and the vehicle door.

The number of panels welded together for providing the flange 16 varies from one to about eight according to the position in the door opening portion 12 of the body 124. Therefore, the thickness of the flange 16 varies from 0.5 mm to 7.0 mm according to the position in the door opening portion 12.

The opening trim weather strip 122 is formed straight by extrusion. The opening trim weather strip 122 thus extruded straight is attached to the flange 16 into a loop-like configuration in conformity with a configuration of the door opening portion 12. The opening trim weather strip 122 is attached to the flange 16 sequentially from one end to the other end thereof. When the attachment is completed, ends of the opening trim weather strip 122 are joined to each other. These ends may be joined via a joint 126 by molding into a loop-like configuration.

Alternatively, ends of the opening trim weather strip 122 may be bonded to each other into a loop-like configuration using an adhesive before attached to the flange 16.

Next, embodiments of the opening trim weather strip 122 will be explained with reference to FIGS. 8 through 18.

Figure 8:
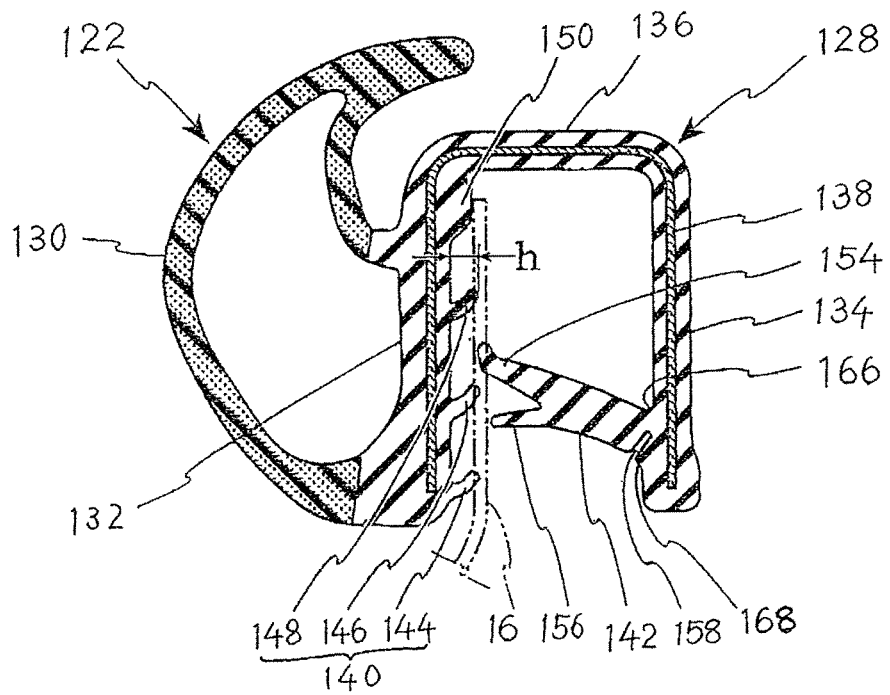
FIG. 8 is a sectional view of a first embodiment of an opening trim weather strip in accordance with the present invention.

As shown in FIG. 8, the opening trim weather strip 122 has a trim portion (base portion) 128 with a generally U-shaped cross section, which is adapted to be attached to the flange 16, and a tubular seal portion 130 formed integrally with the trim portion 128 to contact a protruding part of the door frame, thereby providing a seal between the vehicle door and the door opening portion 12.

In the present embodiment, the tubular seal portion 130 is integrally formed in an exterior surface of an outer side wall 132 of the trim portion 128. The trim portion 128 is composed of a solid material, and the tubular seal portion 130 is composed of a sponge material.

The trim portion 128 has an outer side wall 132, an inner side wall 134 and a bottom wall 136 to define a generally U-shaped cross-section. An insert member 138 is embedded in the trim portion 128 for increasing its holding strength against the flange 16. The insert member 130 is made of a metallic plate or a hard resin, and in order to ensure the flexibility of the trim portion 128 upon attaching of the same to corners, it is configured like a ladder, a fish bone, a zigzag, etc. The trim portion 128 is composed of a solid material or a finely foamed material.

Outer holding lips 140 and an inner holding lip 142 adapted to hold the flange 16 are provided in the outer side wall 132 and the inner side wall 134 so as to respectively extend in a longitudinal direction thereof. Ends of the outer holding lips 140 and the inner holding lip 142 contact both side faces of the flange 16 to securely hold the same. Consequently, the trim portion 128 is prevented from turning to fall down, whereby the tubular seal portion 130 securely contacts the door frame 14, etc., thereby ensuring the sealing properties.

In the present embodiment, after extrusion, the outer holding lips 140 includes three short lips. Namely, a first outer holding lip 144, a second outer holding lip 146 and a third outer holding lip 148 are formed using an identical material to that of the outer side wall 132 in sequence from the side of an opening of the trim portion 128 at generally identical intervals.

The first outer holding lip 144 is provided in the outer side wall 132 nearest to the opening of the trim portion 128, and is formed in the vicinity of an end of the insert 138 embedded in the outer side wall 132. Ends of the first outer holding lip 144, the second outer holding lip 146 and the third outer holding lip 148 slightly bend or incline towards an interior of the trim portion 128 (namely, towards the bottom wall 136).

An outer protrusion 150 is formed in an interior surface of the outer side wall 132 near the bottom wall 136 so as to protrude towards the inner side wall 134 with a trapezoidal cross-sectional shape. The height of the outer protrusion 150 is determined to be about 0.2 mm, for example, which is slightly less than that of the first outer holding lip 144, the second outer holding lip 146 and the third outer holding lip 148 (h in FIG. 8). In the present embodiment, the height (h) is 1.0 mm. When the flange 16 is inserted, the end of the flange 16 contacts the outer protrusion 150 to facilitate the insertion of the flange 16. And when the flange 16 is thin, as shown in FIG. 8, the outer protrusion 150 acts to stop the counterclockwise turn of the flange 16 against the trim portion 128.

The inner holding lip 142 is made long so as to project obliquely in an interior of the trim portion 128, namely, towards the bottom wall 136. The inner holding lip 142 and the inner side wall 134 are composed of an identical material to each other. The inner holding lip 142 has a base part 152 extending from an interior surface of the inner side wall 134 near an open end thereof, a main lip 154 projecting continuously with an end of the base part 152 in the extending direction thereof, and a sub-lip 156 projecting from a surface of the end of the base part 152, which faces the opening of the trim portion 128, towards the opening of the trim portion 128 obliquely with respect to the main lip 154. Namely, the base part 152 and the main lip 154 incline towards the bottom wall 136, whereas the sub-lip 136 inclines towards the opening of the trim portion 128 (in an opposite direction to the bottom wall 136).

Ends of the first outer holding lip 144, the second outer holding lip 146 and the third outer holding lip 148 and ends of the main lip 154 and the sub-lip 156 are located on a generally same plane with each other (preferably, slightly overlap by about 0.2 mm) so that, as described later, they can hold the flange 16 while evenly contacting surfaces of the flange 16. Where the flange 16 is composed of a single metal sheet, and is thin, both of the ends of the main lip 154 and the sub-lip 156 contact an inner side surface of the flange 16.

A slit 158 is formed in a joint between the base part 152 and the inner side wall 134. The slit 158 extends inwardly (in the direction of the bottom wall 136) from a surface facing the opening of the trim portion 128 so as to be inclined with the inner side wall 134. Therefore, the thickness of the joint between the base part 152 and the inner side wall 134 decreases. The configuration of the slit 158 will be described later.

A projection 168 is formed in the inner side wall 134 along an entrance of the slit 158 so as to face a surface of the base part 152.

A surface of the base part 152, which faces the opening of the trim portion 128, curves concavely towards the bottom wall 136. A surface of the base part 152, which faces the interior of the trim portion 128, slightly curves convexly towards the bottom wall 136.

The main lip 154 extends from the end of the base part 152, and a surface of the main lip 154, which faces the interior of the trim portion 128, continues with an interior surface of the base part 152 and slightly curves convexly towards the bottom wall 136. A surface of the base part 152, which faces the opening of the trim portion 128, is formed obliquely inwardly (namely in the direction of the bottom wall 136) so as to incline at an angle greater than that of its interior surface. As a result, the thickness of the main lip 154 decreases towards an end thereof.

Figure 9:
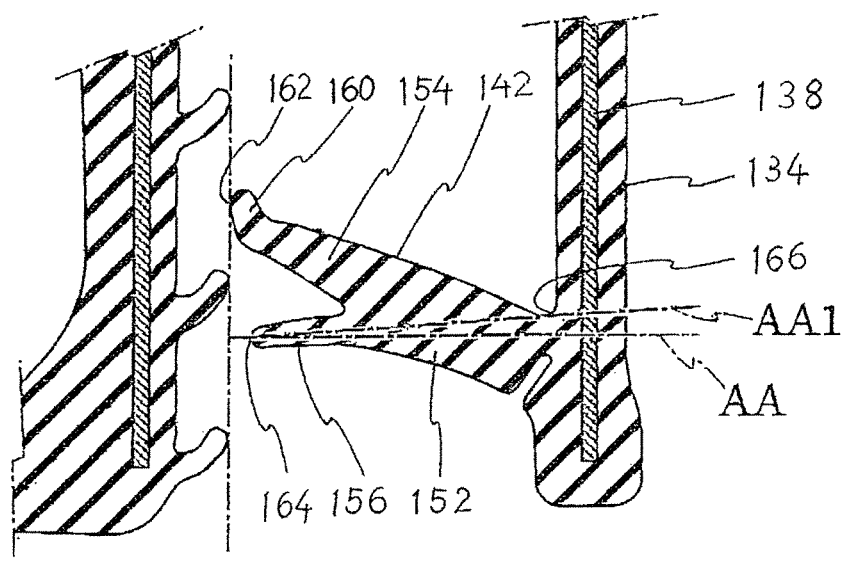
FIG. 9 is an enlarged sectional view of one embodiment of an opening trim weather strip in the vicinity of an opening of a trim portion thereof.

As shown in FIG. 9, the main lip 154 may have a bending part 160 at an end thereof so as to obliquely bend in the direction of the interior of the trim portion 128. With this arrangement, when the flange 16 is inserted in the interior of the trim portion 128, the bending part 160 of the main lip 154 flexes along a bending point thereof to decrease the insertion load of the flange 16, enlarge the contact area of the bending part 160 against the flange 16 and increase the removal load thereof, whereby the holding force of the flange is increased. The bending point refers to an angled part in the inner holding lip 142, at which the bending part 160 bends from the main lip 154, and an end 162 of the main lip 154 is also an end of the bending part 160.

As described above, the sub-lip 156 extends from the end of the base part 152 obliquely with respect to the main lip 154 in the direction of the opening of the trim portion 128. The surfaces of the sub-lip 156 and the base part 152, which face the opening of the trim portion 128, are continuous with each other, and define a curved surface concaved towards the bottom wall 136. Therefore, when the thin flange 16 is inserted, and an end 164 of the sub-lip 156 contacts the flange 16, the sub-lip 156 turns to face the opening of the trim portion 128, whereby the distance between the end 162 of the main lip 154 or the bending point thereof and the end 164 of the sub-lip 156 is prevented from decreasing from the initial distance so that the flange 16 can be held stably even when the trim portion 128 turns.

The sub-lip 156 is formed such that the thickness thereof gradually decreases from its root towards the end 164. In addition, the entire length of the sub-lip 156 is made longer than the thickness ($T_2$ in FIG. 10) of the root of the sub-lip 156 continuous with the base part 152. Therefore, the flexibility of the sub-lip 156 increases to decrease the insertion load of the flange 16, and the sub-lip 156 can contact the flange 16 securely.

The sub-lip 156 is made shorter and thin than the main lip 154 so that when the thin flange 16 is inserted, the sub-lip 156 does not increase the insertion load of the flange 16.

As shown in FIG. 9, the end 164 of the sub-lip 156 is formed so as to be located on the opening side (on the side away from the bottom wall 136) of a root 166 as an interior surface of the joint between the base part 152 and the inner side wall 134. The dot and dash line AA in FIG. 9 is a line drawn from the end 164 of the sub-lip 156 perpendicularly to the inner side wall 134. The root 166 is located on the interior side of the line AA (that is on the side of the bottom wall 136). Therefore, the end 164 of the sub-lip 156 can be located on the opening side of the joint between the base part 152 and the inner side wall 134 relative to a plane perpendicular to the interior surface of the inner side wall 134, whereby the inner holding lip 142 can hold the inner side surface of the flange 16 stably.

In addition, when the end 164 of the sub-lip 156 contacts the flange 16, and the flange 16 applies a force thereto, the joint between the base part 152 and the inner side wall 134 can receive a resulting load, whereby the turn of the flange 16 can be prevented, and the inner side surface of the flange 16 can be held stably.

Furthermore, it is preferable that, as shown in FIG. 9, the line (AA1) connecting the end 164 of the sub-lip 156 and the root 166 of the base part 152 to each other constantly passes the cross-section of the inner holding lip 142. In this case, the force applied to the end 164 of the sub-lip 156 can be directly received with the inner holding lip 142, whereby the inner holding lip 142 can hold inner side surface of the flange 16 securely and stably.

Figure 10:
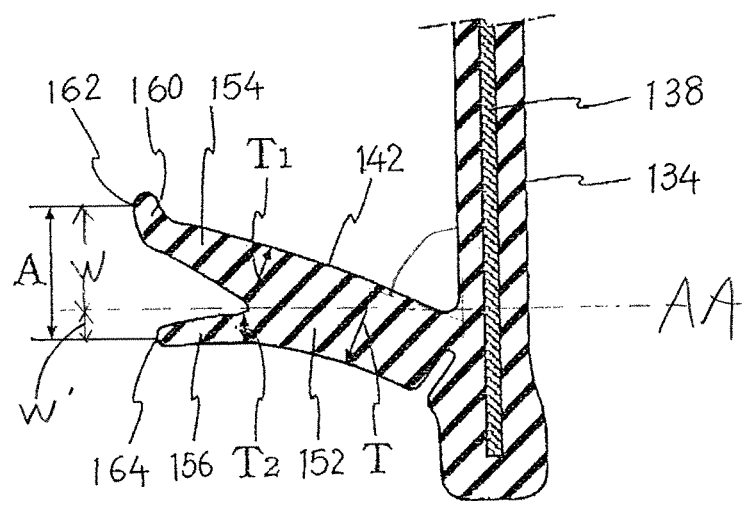
FIG. 10 is an enlarged sectional view of one embodiment of an opening trim weather strip in the vicinity of an inner holding lip of a trim portion thereof.

And, as shown in FIG. 10, the thickness (T) of the base part 152 of the inner holding lip 142 is approximately equal to the sum of the thickness ($T_1$) of a root of the main lip 154 and the thickness ($T_2$) of a root of the sub-lip 156.

The thickness (T) is over 2.0 mm and less 4.0 mm. If The thickness (T) is less than 2.0 mm, the rigidity of the main lip 154 and the sub-lip 156 is reduced. If The thickness (T) is more than 4.0 mm, the rigidity of the main lip 154 and the sub-lip 156 is too much improved.

In the present embodiment, the thickness (T) is 2.6 mm, the thickness ($T_1$) is 1.8 mm and the thickness ($T_2$) is 0.8 mm. The thickness ($T_1$) is less than the thickness ($T_2$) and the sub-lip 156 is thinner than the main lip 154.

And, as described above, the thickness T varies from 0.8 to 1.2 times as large as the value of $T_1+T_2$, and the maximum value of the thickness T is about 4.0 mm.

Therefore, the thickness of the base part 152 is great so as to be able to hold the main lip 154 ad the sub-lip 156 securely. In addition, when the flange 16 with a great thickness is inserted, the side surface of the sub-lip 156 can be prevented from protruding to increase the insertion load.

The thickness ($T_1$) of the root of the main lip 154 is about twice as large as the thickness ($T_2$) of the root of the sub-lip 156 so that when the flange 16 with a great thickness is inserted, it contacts the surface of the main lip 154, which faces the opening of the trim portion 128, whereby the insertion force of the flange 16 can be reduced.

As shown in FIG. 10, it is preferable to determine the distance (A) between the end 162 of the main lip 154 and the end 164 of the sub-lip 156 so as to satisfy the formula (1). It is more preferable the distance (A) is over 2.5 mm and less 10.0 mm. If the distance (A) is less than 2.5 mm, the holding force of the flange 16 by the main lip 154 and the sub-lip 156 is insufficient and it is difficult to mold the main lip 154 and the sub-lip 156.

If the distance (A) is more than 10.0 mm, the holding force of the flange 16 by the main lip 154 and the sub-lip 156 is insufficient and easy bend, because two lips separate each other and became longer.

In this case, the distance (A) is 3.8 mm and W is 3.3 mm, W' is 0.5 mm.

L is the entire length (L) of the inner holding lip 142 (inclusive of the bending part 160 of the main lip 154). It is preferable the entire length (L) is more than 6 mm. In this case, L is 9.1 mm. The angle θ is an angle between the inner side wall 134 and the main lip 154. The angle θ is 60°≦θ<90° The angle θ is more preferable 65°≦θ≦85°.

When the flange 16 is moved into the trim portion, the inner holding lip 142 bend easily and the insertion force of the flange 16 can be reduced, because the angle θ is less than 90°. The holding force of the inner holding lip 142 and the removing force from the flange 16 are insured in accordance with the angle θ is less than 90°. By this way, the moving force and removing force of the flange 16 is well balanced.

When thin flange 16 is moved into the trim portion, rotation of the trim portion can prevent.

$$2.5 \leq A \leq (L \cdot \cos\theta) + W' \qquad (1)$$

W is the distance between the end 162 of the main lip 154 and the line AA. W' is the distance between the line AA and the end 164 of the sub-lip 156. It is preferable the distance W' is 0.0 mm<W'≦3.5 mm.

In this case, the width by which the end 162 of the main lip 154 and the end 164 of the sub-lip 156 contact the flange 16 and hold the same can be adjusted, thereby holding the flange 16 more stably.

Figure 11:
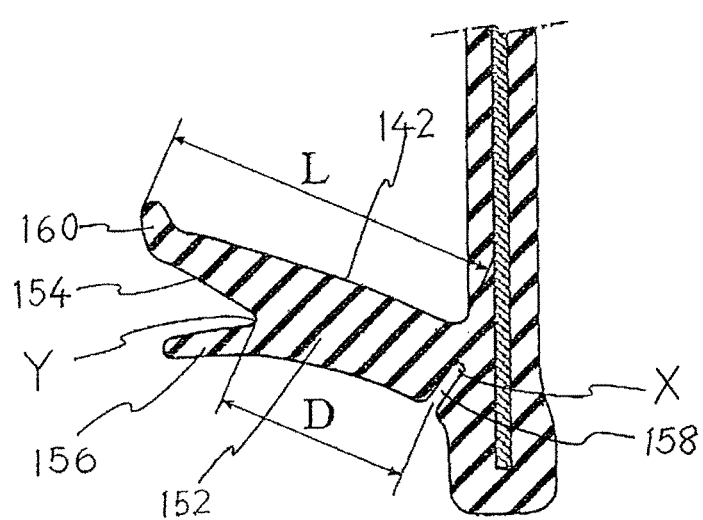
FIG. 11 is an enlarged sectional view of one embodiment of an opening trim weather strip in the vicinity of an inner holding lip of a trim portion thereof.

As shown in FIG. 11, it is preferable to determine the length (D) of the base part 152 relative to the entire length (L) of the inner holding lip 142 (inclusive of the bending part 160 of the main lip 154) so as to satisfy the formula (2). The length (D) of the base part 152 refers to the length between a bottom of the slit 158 (point X in FIG. 11) and a root of a diverging point of the main lip 154 and the sub-lip 156 (point Y in FIG. 11). In the present embodiment, the length (D) is 6.0 mm and the length (L) is 9.1 mm.

$$\tfrac{1}{4}L \leq D \leq \tfrac{3}{4}L \qquad (2)$$

In this case, the base part 152 supports the main lip 154 and the sub-lip 156 to improve the rigidity of the inner holding lip 142, thereby holding the flange 16 more stably.

And it is preferable to locate the point X on an opening side of the point Y.

Figure 12:
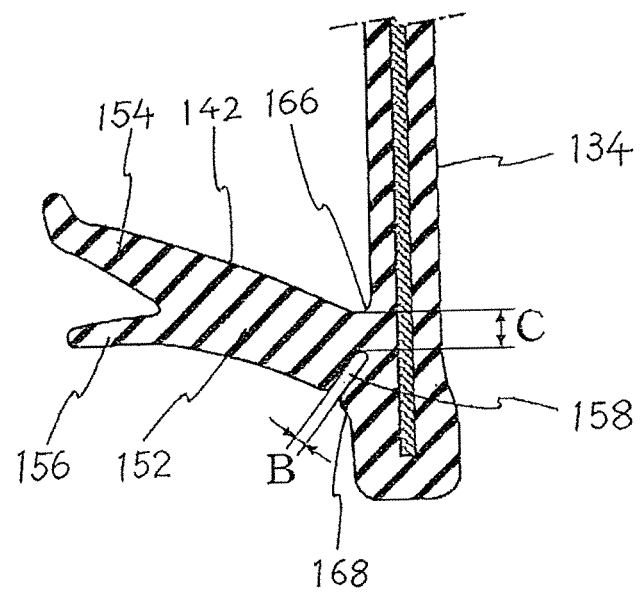
FIG. 12 is an enlarged sectional view of one embodiment of an opening trim weather strip in the vicinity of an inner holding lip of a trim portion thereof.

Next, the slit 158 will be explained with reference to FIG. 12. As shown, the slit 158 is narrow and defined with parallel surfaces. In order to prevent the inner holding lip 142 from flexing towards the opening of the trim portion 128, it is preferable to narrow the slit 158, but where the slit 158 is too narrow, the parallel surfaces defining the slit 158 closely contact each other upon extrusion, so that the space (B in FIG. 12) of at least about 0.8 mm is required between the parallel surfaces.

As described later, when the flange 16 is removed from the trim portion 128, the inner holding lip 142 flexes towards the opening of the trim portion 128 so that the parallel surfaces defining the slit 158 closely contact each other to close the slit 158, whereby the inner holding lip 142 is prevented from excessively flexing to enlarge the removal load of the flange 16. The projection 168 is provided in one of the parallel surfaces defining the slit 158, which is on the side of the inner side wall 134, along the entrance of the slit 158, thereby preventing excess flexing of the inner holding lip 142.

The root 166 of the base part 152, which is adjacent to the inner side wall 134, is formed to have a minimum radius of curvature. The space (C in FIG. 12) between the bottom of the slit 158 and the root 166 is made small. In the present embodiment, the length C is 1.0 mm. Therefore, when the flange 16 is inserted in an interior of the trim portion 128, the slit 158 opens to flex the inner holding lip 142, thereby decreasing the insertion load of the flange 16, which is effective, in particular, in the case of the flange 16 being thick.

Figure 13:
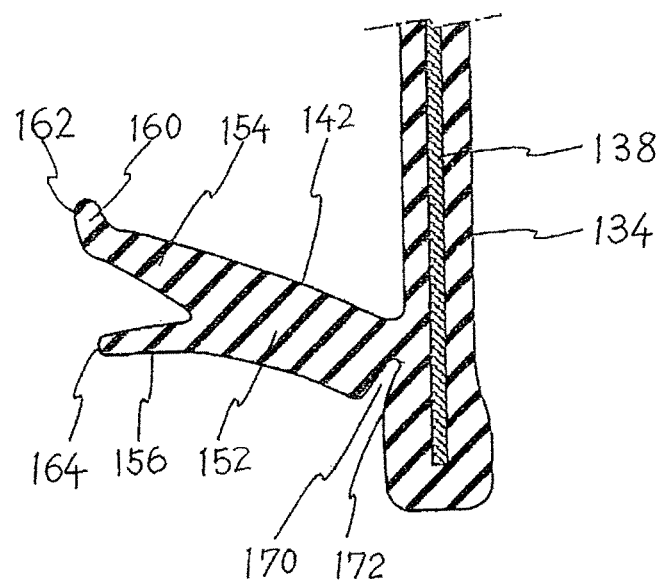
FIG. 13 is an enlarged sectional view of another embodiment of an opening trim weather strip in the vicinity of a slit in an inner holding lip of a trim portion thereof.

Next, another arrangement of both the slit 158 and the projection 168 will be explained, with reference to FIG. 13. As shown, a slit 170 is not defined with parallel surfaces, but inclined surfaces of which the space gradually enlarges towards an entrance thereof. A projection 172 is formed in the inner side wall 134 as a gently sloping projection. As a result, when the flange 16 is removed from the trim portion 128, the inner holding lip 142 can readily flex towards the opening of the trim portion 128. And upon extruding, the durability of an extrusion die is improved, thereby facilitating the extrusion work.

Figure 14:
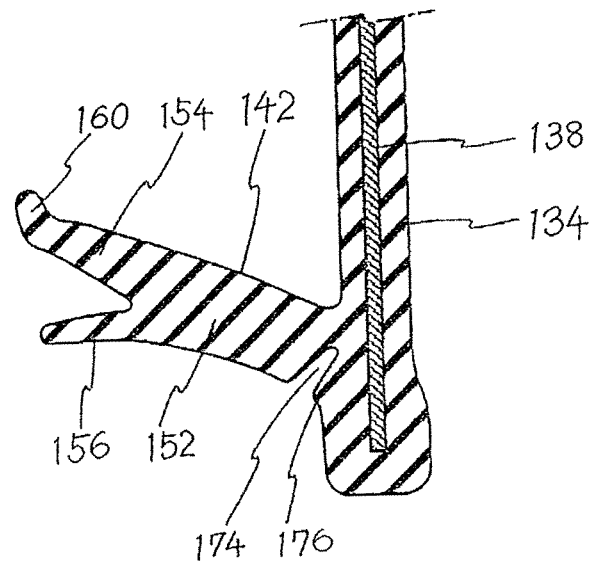
FIG. 14 is an enlarged sectional view of still another embodiment of an opening trim weather strip in the vicinity of a differently configured slit in an inner holding lip of a trim portion thereof.

Next, still another arrangement of both the slit 158 and the projection 168 will be explained, with reference to FIG. 14. As shown, a slit 174 is not defined with parallel surfaces, but inclined surfaces of which the space gradually enlarges towards an entrance thereof. A projection 176 is formed in the inner side wall 134 as a projection greater than the projection 172 shown in FIG. 13. As a result, when the flange 16 is removed from the trim portion 128, the flexion of the inner holding lip 142 can be slightly decreased, as compared with the case of the projection 172 shown in FIG. 13, whereby the removal load of the flange 16 can be enlarged. And upon extruding, the durability of an extrusion die is improved, thereby facilitating the extrusion work.

Figure 15:
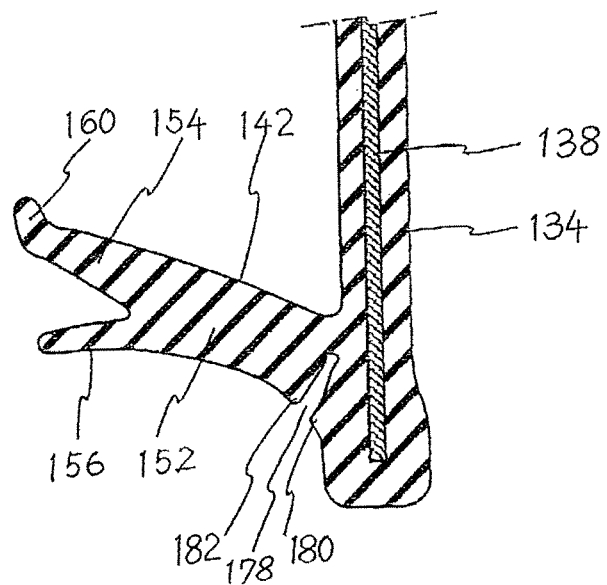
FIG. 15 is an enlarged sectional view of a further embodiment of an opening trim weather strip in the vicinity of another differently configured slit in an inner holding lip of a trim portion thereof.

Next, a further arrangement of both the slit 158 and the projection 168 will be explained, with reference to FIG. 15. As shown, a slit 178 is not defined with parallel surfaces, but inclined surfaces of which the space gradually enlarges towards an entrance thereof. A projection 180 is formed in the inner side wall 134 as a projection greater than the projection 172 shown in FIG. 13, whereas a projection 182 is provided in the surface of the base part 152, which defines the slit 178, so as to project towards the opening of the trim portion 128. Therefore, when the flange 16 is removed, the contact area of the projections 180 and 182 enlarges. As a result, the inner holding lip 142 can be held more securely to decrease the flexion thereof towards the opening of the trim portion 128, and upon extruding, the durability of an extrusion die is improved to facilitate the extrusion work.

Next, the state in which a thick flange 16 is inserted in an interior of the trim portion 128 will be explained with reference to FIG. 16.

As described above, the thickness of the flange 16 varies in accordance with the number of the metal sheets composing the flange 16, which depends on the position in the door opening portion 12. When the flange 16 is thickest, the thickness is designated as F in FIG. 16. In this case, the width (E) of the interior of the trim portion 128 is made at least slightly greater than the sum of the thickness (F) of the flange 16 and the thickness (T) of the base part 152. In the present embodiment, the width E is 9.0 mm, and the thickness F is 6.4 mm.

Figure 16:
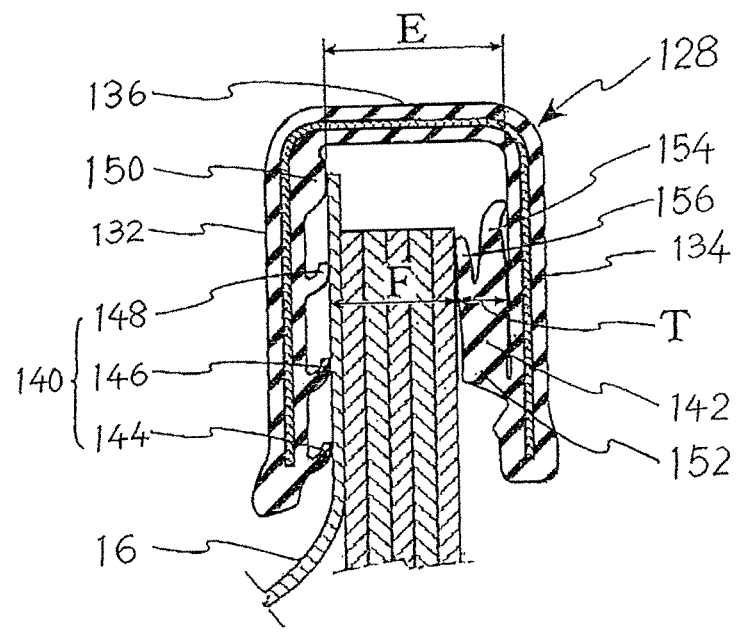
FIG. 16 is a sectional view of one embodiment of an opening trim weather strip in accordance with the present invention, in a state where a flange is inserted in a trim portion thereof.

As shown in FIG. 16, when the flange 16 is inserted, the inner holding lip 142 closely contacts the interior surface of the inner side wall 134 to hold the inner side surface of the flange 16, whereas the outer side surface of the flange 16 is held with the first outer holding lip 144, the second outer holding lip 146, the third outer holding lip 148 and the outer protrusion 150. And the sub-lip 156 contacts the inner side surface of the flange 16, whereby the main lip 154 is held between the sub-lip 156 and the interior surface of the inner side wall 134. As a result, even where the flange 16 is thick, the flange 16 can be securely held with the outer holding lips 140 and the inner holding lip 142.

The holding of the flange 16 of which the thickness is small will be explained with reference to FIG. 17 and FIG. 18.

When the flange 16 is inserted in the trim portion 128, the outer side surface of the flange 16 is held with the first outer holding lip 144, the second outer holding lip 146, and the third outer holding lip 148 of the outer holding lips 140, whereas the inner side surface of the flange 16 is held with the main lip 154 and the sub-lip 156 of the inner holding lip 142.

Figure 17:
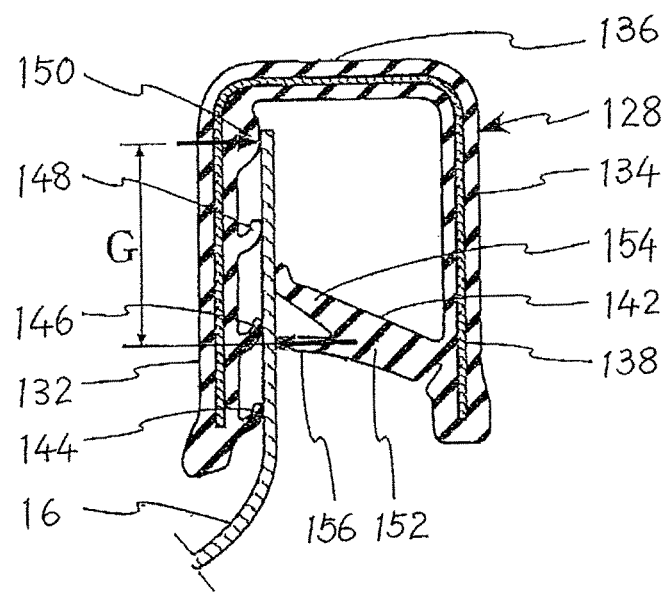
FIG. 17 is a sectional view of one embodiment of an opening trim weather strip in accordance with the present invention, in a state where a flange is inserted in a trim portion thereof, and such a force as to turn the flange counterclockwise is applied.

Therefore, as shown in FIG. 17, where the flange 16 is long, the main lip 154 and the sub-lip 156 can hold the inner side surface of the flange 16 at two points over a greater width. Even where the trim portion 128 rocks to turn clockwise against the flange 16, an inserting end of the flange 16, which is located on the side of the bottom wall 136, contacts the outer protrusion 150, and the distance G between the sub-lip 156 and the outer protrusion 150 is great, whereby the trim portion 128 is prevented from turning, and the flange 16 can be held stably. In the present embodiment, the distance G is 11.0 mm. Where the flange 16 is short, or the outer protrusion 150 is not provided, the third outer holding lip 148 can hold the inserting end of the flange 16, thereby holding the flange 16 stably.

Figure 18:
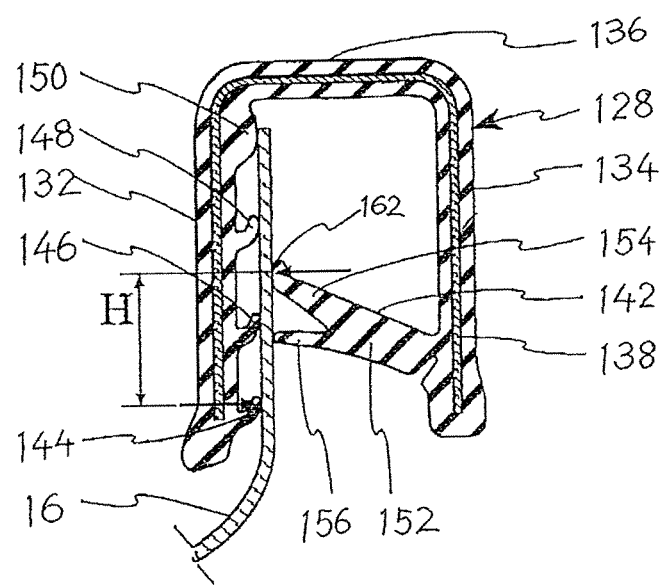
FIG. 18 is a sectional view of an embodiment of an opening trim weather strip in accordance with the present invention, in a state where a flange is inserted in a trim portion thereof, and such a force as to turn the flange clockwise is applied.

In addition, as shown in FIG. 18, even where the trim portion 128 rocks to turn about the end 162 of the main lip 154 counter clockwise, the distance H between the first outer holding lip 144 and the end 162 of the main lip 154 is great so that the trim portion 128 is prevented from turning, and the flange 16 can be held stably. In the present embodiment, the distance H is 6.5 mm. And when the trim portion 128 does not turn, the flange 16 can be held with a good balance at three points by the end 162 of the main lip 154, an end of the first outer holding lip 144 and the end of the sub-lip 156.

The tubular seal portion 150 of the opening trim weather strip 122 is composed of a sponge material such as an EPDM rubber or an olefin thermoplastic elastomer. The trim portion 128, the outer holding lips 140 and the inner holding 142 are composed of a solid material or finely foamed material of an EPDM rubber or an olefin thermoplastic elastomer. In this case, products exhibiting good weather resistance can be obtained. And the opening trim weather strip 122 is entirely composed of olefin materials so that they can be recycled after pulverized together.

IN case of thin flange 16, it is possible to prevent the rotation of the trim portion with the following condition.

$$A \leq L \cdot \cos\theta + W' \quad (3)$$

$$-1.0 \text{ mm} \leq W'$$

In this case it is preferable W' is 0.5 mm±1.5 mm.

Next, the producing method of the opening trim weather strip 122 in accordance with the present invention will be explained.

This opening trim weather strip 122 is formed by extrusion, and a solid material composing the trim portion 128, the insert 138, and a sponge material composing the tubular seal portion 130 can be integrally extruded with an extruder.

Then, in the case of rubber materials, vulcanization is carried out by a normal method, and the vulcanized member is cut to a predetermined length as a single piece of the opening trim weather strip.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip adapted to provide a seal between a closing member for closing an opening in a body of a motor vehicle and an opening portion of the body of the motor vehicle, comprising:
    a trim portion for attachment to a flange provided in one of the closing member and the opening portion; and
    a seal portion integrally formed with said trim portion for contacting one of the opening portion and the closing member to provide a seal between the closing member and the opening portion,
    wherein said trim portion includes an outer side wall, an inner side wall and a bottom wall, and has a generally U-shaped cross-section,
    wherein said trim portion includes a plurality of outer holding lips in an interior surface of said outer side wall, and an inner holding lip in an interior surface of said inner side wall so as to project into an interior of said trim portion obliquely,
    wherein said inner holding lip includes a base part extending from said interior surface of said inner side wall, a main lip formed continuously with an end of said base part in an extending direction of said base part, and a sub-lip formed to project from a side surface of said end of said base part, which faces an opening of said trim portion, towards an opening of said trim portion obliquely with respect to said main lip,
    wherein said sub-lip is made shorter than said main lip, and an end of said sub-lip is located on an opening side of an interior surface of a joint between said base part and said inner side wall,
    wherein the sub-lip is formed such that a thickness thereof gradually decreases from a root thereof toward an end thereof, and such that an entire length thereof is greater than the thickness of the root, which is continuous with the base part,
    wherein the inner holding lip includes a slit that extends from an exterior surface of the joint between the base part and the inner side wall inwardly of the joint, and
    wherein a projection is provided in one of a surface of the inner side wall and a surface of the base part, which define the slit, in a vicinity of an entrance of the slit.

2. A weather strip as claimed in claim 1, wherein said end of said sub-lip is located between said interior surface of said joint between said base part and said inner side wall, and an exterior surface of said joint between said base part and said inner side wall.

3. A weather strip as claimed in claim 1, wherein a surface of said sub-lip, which faces said opening of said trim portion, curves so as to concave in a direction of said bottom wall.

4. A weather strip as claimed in claim 1, wherein one of said outer holding lips is located between said end of said main lip and said end of said sub-lip.

5. A weather strip as claimed in claim 1, wherein said main lip has a bending part at said end thereof, which obliquely bends in a direction of an interior of said trim portion.

6. A weather strip as claimed in claim 1, wherein said inner holding lip comprises a single body.

7. A weather strip as claimed in claim 1, wherein said end of said outer holding lip and said end of said inner holding lip respectively contact side surfaces of the flange, when said trim portion is attached to the flange.

8. A weather strip as claimed in claim 1, wherein said trim portion further includes an insert that is embedded in said outer side wall, said inner side wall and said bottom wall.

9. A weather strip as claimed in claim 8, wherein the weather strip formed by extrusion and includes a solid material comprising the trim portion and the insert, and a sponge material comprising the seal portion.

10. A weather strip as claimed in claim 1, wherein said trim portion further includes an outer protrusion that protrudes from the vicinity of a joint between an interior surface of said outer side wall and said bottom wall.

11. A weather strip as claimed in claim 10, wherein a height of the outer protrusion is less than a height of the plurality of outer holding lips.

12. A weather strip as claimed in claim 1, wherein a formula $2.5 \leq A \leq (L \cdot \cos \theta) + W'$ is satisfied, and
    wherein a line drawn perpendicularly from the end of the sub-lip to the inner side wall is line AA, A denotes a distance between the end of the main lip and the end of the sub-lip, L denotes the entire length of the inner holding lip, inclusive of the bending part of the main lip, $\theta$ denotes the angle between the inner side wall and the main lip, W denotes the distance between the end of the main lip and the line AA, and W' denotes the distance between the line AA and the end of the sub-lip.

13. A weather strip as claimed in claim 12, wherein the equation $A = (L \cdot \cos \theta) + W'$ is satisfied.

14. A weather strip as claimed in claim 1, wherein a relation expression $\frac{1}{4}L \leq D \leq \frac{3}{4}$ is satisfied,
    wherein D denotes a length of the base part and L denotes an entire length of the inner holding lip.

15. A weather strip as claimed in claim 1, wherein the closing member comprises a door, and the weather strip comprises an opening trim weather strip.

16. A weather strip as claimed in claim 1, wherein a surface of the base part facing the opening of the trim portion curves concavely toward the bottom wall, and a surface of the base part facing the interior of the trim portion curves convexly toward the bottom wall.

17. A weather strip as claimed in claim 1, wherein a thickness of the base part is substantially equal to a sum of a thickness of a root of the main lip and a thickness of the root of the sub-lip.

* * * * *